Oct. 4, 1932.    R. T. GLASCODINE    1,881,312
BUFFING AND DRAW GEAR FOR RAILWAY VEHICLES
Filed April 8, 1929    2 Sheets-Sheet 1
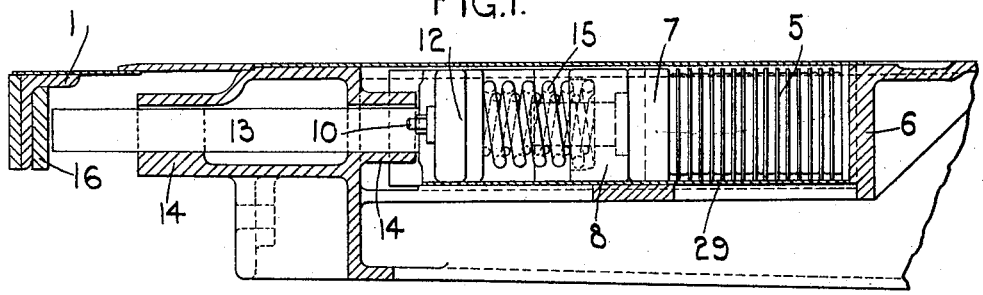
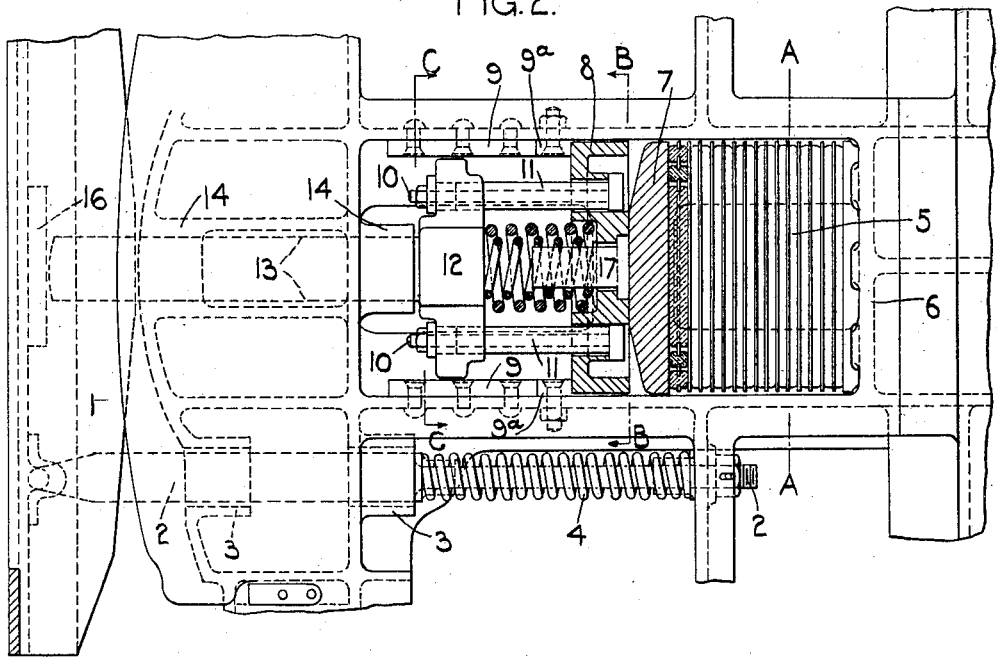
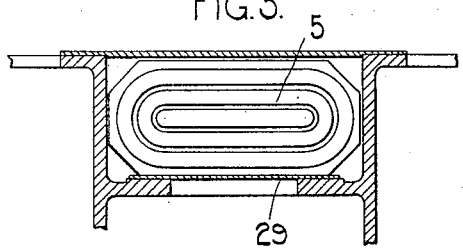
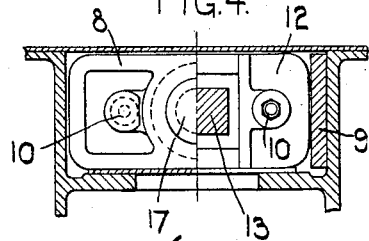
Inventor
Richard T. Glascodine
by Herbert W. P. Jenner,
Attorney Oct. 4, 1932.   R. T. GLASCODINE   1,881,312
BUFFING AND DRAW GEAR FOR RAILWAY VEHICLES
Filed April 8, 1929   2 Sheets-Sheet 2

Inventor
Richard T. Glascodine
by Herbert W. Brunner
Attorney

Patented Oct. 4, 1932

1,881,312

UNITED STATES PATENT OFFICE

RICHARD THOMSON GLASCODINE, OF LONDON, ENGLAND, ASSIGNOR OF ONE-HALF TO GEORGE SPENCER, MOULTON & COMPANY, LIMITED, OF LONDON, ENGLAND

BUFFING AND DRAW GEAR FOR RAILWAY VEHICLES

Application filed April 8, 1929, Serial No. 353,563, and in Great Britain March 6, 1929.

This invention relates to buffing and draw gear for railway vehicles of the kind having sliding vestibule ends. Vehicles of this kind are generally furnished with helical steel springs normally arranged to maintain the sliding vestibule end members in their extended positions so that the vestibules of adjacent vehicles contact one with the other to provide an unbroken passage connecting the vehicles of a train of such vehicles. The said vehicles are also furnished with friction buffing and draw gear in association with the draw bar of the coupler head at each end of the vehicle.

An object of the present invention is to provide efficient arrangements of india rubber springs suitable for use as vestibule buffers, and as buffing and draw springs in vehicles of the kind in question.

The advantages of india rubber springs for buffing and draw purposes are well recognized and the difficulties of employing the same in connection with vehicles of type mentioned have been overcome by spring arrangements according to the invention in which india rubber springs compressed by inward movement of the platform when buffing act conjointly with india-rubber buffer springs that are compressed simultaneously by inward movement of the coupler head.

Considering firstly the vestibule buffing arrangements, it is obviously desirable to provide a relatively light spring of a quickly responsive character to maintain the vestibules in close contact with each other even when the extension of the draw bar under the normal or excessive tractive effort tends to separate them, and for this purpose it is considered preferable to employ helical steel springs as heretofore but, according to the present invention, substantial buffing shocks are resisted and absorbed by india-rubber springs of a type and capacity such as to be effective in the shock absorbing necessary when buffing. That is to say, the india-rubber springs compressed by inward movement of the vestibules constitute and function as buffing springs for the vehicle in combination with the buffing springs associated with the draw rod of the coupler head.

Furthermore, according to the invention, the buffing and draw springs associated with the draw bar of the coupler head are india-rubber springs.

Preferably, the india-rubber springs employed in carrying out the invention are of the well-known type comprising concentric rings or frames of india-rubber moulded on to metal plates, which maintain them in proper relative positions. Any desired number of these spring units are arranged in column form with metal dividing plates interposed between the units in the well-known and usual manner.

Figs. 1 and 2 of the accompanying drawings show in sectional elevation and in sectional plan respectively the platform end of a vehicle embodying the invention.

Fig. 3 is a transverse section corresponding to the line A A of Fig. 2.

Fig. 4 is, as regards the left-hand half of the figure, a transverse section corresponding to the line B B of Fig. 2, and, as regards the right-hand half of the figure, a transverse section corresponding to the line C C of Fig. 2.

Figure 5:
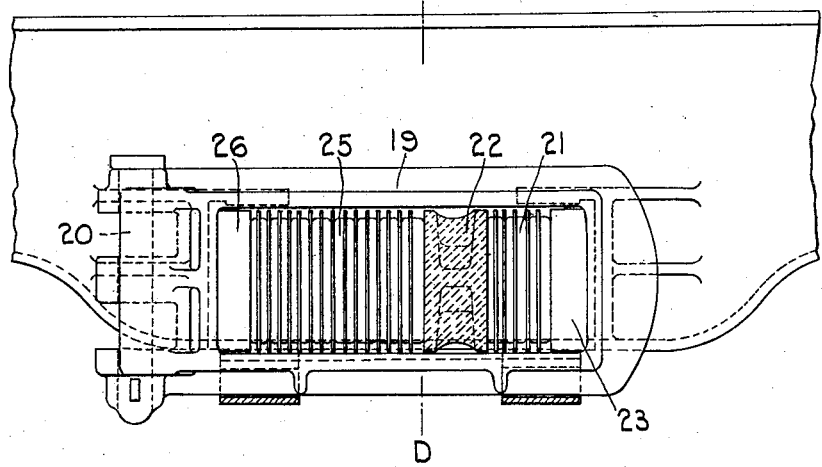
Fig. 5 is a sectional elevation of the buffing and draw spring arrangement associated with the automatic central coupler.
Figure 6:
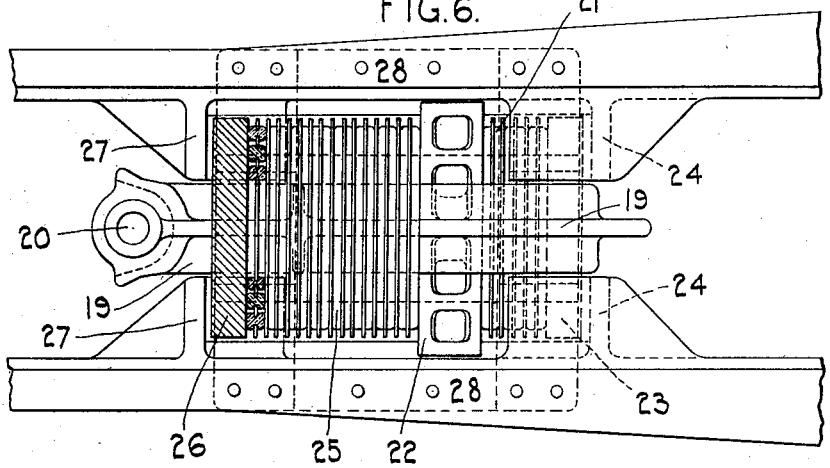
Fig. 6 is a sectional plan of said buffing and draw spring arrangement.
Figure 7:
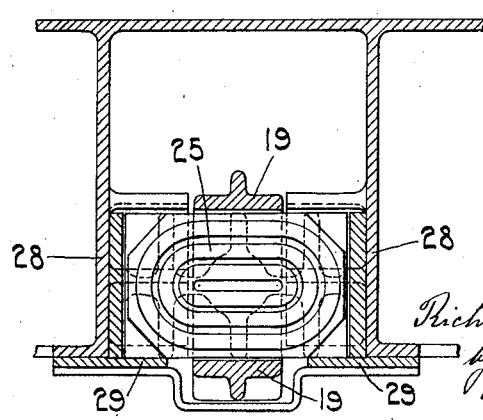
Fig. 7 is a transverse section corresponding to the line D D of Fig. 5.

The construction of buffing and draw gear in the example illustrated is applied to a railway passenger vehicle of the before-mentioned type comprising end platform buffers and central buffing and draw gear.

As usual in this type of vehicle, the end platform comprises a platform member 1 mounted to slide and rock relatively to the body of the vehicle, the said member being in the usual manner journalled to side rods 2 mounted to slide in bearings 3 formed in a housing fixed to the vehicle bottom frame, helical steel springs 4 being mounted on the rods 2 in such a way as constantly to tend to maintain the sliding member 1 extended to its full permissible extent. These side springs 4 also tend to maintain the sliding member in proper position at right angles to the longitudinal axis of the vehicle.

When two vehicles are connected by the usual central coupler, which is not illustrated, the sliding end members 1 are moved inwardly against the action of their side springs 4. Associated with each platform 1 is a centrally arranged buffer comprising a column of rubber springs 5 of the kind before stated located between a rear abutment member 6 of the housing, and a compression plate 7 that bears against an abutment member 8 backed by stops 9 fixed to the housing. The abutment member 8 carries two forwardly extending pins or bolts 10 fitted with tubular sleeves 11 on which there is mounted to slide a cross-head 12 fixed on the inner end of a central push bar 13 that is mounted to slide in fixed bearings 14 formed in the housing. The outer end of the push bar 13 projects through the said bearings, and, when the bar 13 is pushed outwardly to its full extent by means of a helical spring or as shown a pair of helical springs 15 located between the crosshead 12 and the abutment member 8, the front end of the bar terminates just behind but clear of the downwardly extending front flange 16 of the sliding end member 1 when the vehicle is free and uncoupled, and the sliding member consequently pushed out by the side springs 4 to its fullest extent.

When, however, the vehicle is coupled to a similar vehicle, the sliding end member 1 is moved inwardly, and this inward movement results in the push bar 13 being also moved inwardly against the action of the helical steel springs 15 which act to maintain the end platforms in close contact with each other even when the extension of the draw bar under normal or excessive tractive effort tends to separate them.

Projecting forwardly from the front face of the compression plate 7 is a central pin or solid cylindrical boss 17 that passes through a hole formed therefor in the abutment member 8 and against the front end of which the crosshead 12 bears when the platform 1 is moved inwardly beyond the position it is caused to assume when the vehicles are coupled. The construction and arrangement are such that inward movement of the end platform 1 beyond that which it assumes when the vehicles are coupled, namely inward movement due to buffing, results in the india rubber buffer spring 5 being compressed through the push bar 13, its crosshead 12, the pin or boss 17 and the compression plate 7.

The india-rubber buffer spring 5 comprises eight or any other desired number of units arranged in column form, each unit consisting of a number of oval frames of india-rubber moulded concentrically on a metal plate. The complete spring rests on a metal plate 18 fixed to the vehicle bottom structure. It is under any predetermined initial compression and is designed to cushion effectively the buffing shocks to which it may be subjected.

In order to facilitate the assembly of the india-rubber spring 5 under the desired initial compression the fixed stops 9 for the abutment member have portions 9ª that are removable so that the spring can be put in place in a free condition, then compressed, and the removable portions 9ª of the stops fixed in place in order to retain the spring in its initially compressed condition.

The central buffing and draw springs that work in association with the buffing springs 5 of the movable platforms are india-rubber springs of a similar construction to that of the platform buffing spring already described. These central buffing and draw springs are embraced by the yoke 19 usually employed in vehicles of the kind under notice and they replace the friction buffer and draw gear heretofore generally employed. The yoke 19 at its front end is connected by a vertical pivot pin 20 in the usual manner to the inner end of the draw rod which is not shown, the front end of which carries the automatic coupler head.

The india-rubber draw spring 21 is located between the rear face of a fixed transverse abutment member 22, and a rear compression plate 23, the rearward movement of which is limited by fixed abutments 24. The buffing spring 25 is located between the front face of the said fixed abutment 22 and a front compression plate 26, the forward movement of which is limited by fixed abutments 27. The front end of the yoke 19 bears on the front compression plate 26 when buffing, and thereby compresses the buffing spring 25, whilst, when drawing, the rear end of the yoke 19 bears on the rear compression plate 23 and thereby compresses the draw spring 21.

Preferably, the central buffing spring 25 is of substantially the same length as the platform india-rubber buffing spring 5 and the two springs are compressed simultaneously during a buffing operation. The draw spring 21 comprises fewer spring units and is therefore a shorter spring but adequate to function as desired when drawing.

The buffing and draw springs 25 and 21 are arranged between longitudinal members 28 of the vehicle bottom framing and rest on suitably fixed supporting plates 29.

The india-rubber central buffing and draw springs can be given any desired initial compression.

It will be understood that the apparatus described is given merely by way of example and variations in details of construction and arrangement may be made without departure from the invention.

What I claim is:—

In a railway passenger vehicle a collapsible end platform, an india-rubber buffing spring, a compression plate for said buffing spring, a thrust-transmitting member projecting forwardly from said compression plate, a push bar in line with said thrust-transmitting member and arranged to be moved inwardly by inward movement of said end platform, an abutment member through which said thrust-transmitting member extends, stops comprising removable portions against which said abutment member abuts, a helical steel spring mounted on the said thrust-transmitting member and bearing at its front end against said push bar and at its rear end against said abutment, and means for limiting the outward movement of said push bar.

In testimony whereof I affix my signature.

RICHARD THOMSON GLASCODINE.